United States Patent
Coppola et al.

(12) 
(10) Patent No.: US 6,360,138 B1
(45) Date of Patent: Mar. 19, 2002

(54) PUMP AND CUSTOMER ACCESS TERMINAL INTERFACE COMPUTER CONVERTER TO CONVERT TRADITIONAL PUMP AND CUSTOMER ACCESS TERMINAL PROTOCOLS TO HIGH SPEED ETHERNET PROTOCOLS

(75) Inventors: Richard G. Coppola; David Biedermann, both of Austin; Charles Fort, Round Rock, all of TX (US)

(73) Assignee: Dresser, Inc., Addison, TX (US)

(*) Notice: Subject to any disclaimer, the term of this patent is extended or adjusted under 35 U.S.C. 154(b) by 0 days.

(21) Appl. No.: 09/543,530

(22) Filed: Apr. 6, 2000

(51) Int. Cl.[7] ............................................. G06F 17/00
(52) U.S. Cl. ..................... 700/231; 700/237; 700/241
(58) Field of Search ................. 700/231, 234, 700/236, 241, 237; 235/380, 381

(56) References Cited

U.S. PATENT DOCUMENTS

| | | | |
|---|---|---|---|
| 4,967,366 A | * | 10/1990 | Kaehler ................... 700/231 X |
| 5,340,969 A | * | 8/1994 | Cox ......................... 235/381 X |
| 5,535,130 A | | 7/1996 | Long |
| 5,694,326 A | | 12/1997 | Warn et al. |
| 5,945,975 A | * | 8/1999 | Lundrigan et al. ...... 700/234 X |
| 5,980,090 A | | 11/1999 | Royal, Jr. et al. |
| 6,052,629 A | * | 4/2000 | Leatherman et al. .... 700/241 X |
| 6,116,505 A | * | 9/2000 | Withrow .................. 235/381 X |
| 6,152,591 A | * | 11/2000 | McCall et al. .......... 700/231 X |
| 6,176,421 B1 | * | 1/2001 | Royal, Jr. et al. ....... 700/241 X |

* cited by examiner

Primary Examiner—Christopher P. Ellis
Assistant Examiner—Gene O. Crawford
(74) Attorney, Agent, or Firm—Jenkens & Gilchrist, P.C.

(57) ABSTRACT

A fuel station site architecture includes at least one point-of-sale (POS) controller, at least one new generation fuel dispenser having advanced features, and a site forecourt controller coupled between the POS controller and the fuel dispenser. The site forecourt controller includes a device for interfacing the POS controller with the fuel dispenser by providing a protocol and electrical signal interface between a first protocol and electrical signal requirement of the POS controller and a second protocol and electrical signal requirement of the fuel dispenser, wherein the second protocol and electrical signal requirement include requirements for features which may not be supported by a prescribed POS controller.

30 Claims, 5 Drawing Sheets

PUMP AND CUSTOMER ACCESS TERMINAL INTERFACE COMPUTER CONVERTER TO CONVERT TRADITIONAL PUMP AND CUSTOMER ACCESS TERMINAL PROTOCOLS TO HIGH SPEED ETHERNET PROTOCOLS

BACKGROUND

The present invention relates generally to fuel dispensers, and more particularly, to a method and apparatus for converting legacy pump and Customer Access Terminal (CAT) protocols to high speed Ethernet protocols.

The retail petroleum industry utilizes various brands of fuel dispensers for dispensing fuel to customers. Different manufacturers including Dresser Wayne, Gilbarco, Tokheim, and others manufacture the dispensers. Some form of remote dispenser controller is typically used for controlling the dispensers. The remote dispenser controller is often located in a manner where a site attendant can monitor and control particular dispensers from a building at the site. The controller sends data signals (i.e., commands) to the dispensers which can include price to charge for the fuel dispensed, preset amounts of fuel to dispense, and pump authorization to dispense fuel. The dispensers likewise send data signals (i.e., responses) to the controller including pump number, pump status, and dispensed fuel volume and value.

Point-of-sale (POS) systems are widely used in the industry to control fuel dispensers, replacing older methods of dispenser control through a console, which is a separate device from a cash register. POS systems generally utilize an open architectural hardware platform which includes a personal computer (PC) with POS application software programming to integrate functions including cash register, dispenser control, credit card processing, and scanning.

In U.S. Pat. No. 5,694,326, issued Dec. 2, 1997, a fuel pump-card reader control center is disclosed. The fuel pump-card reader control center is used for controlling the fueling process and accepting payment of the dispensed fuel through a computer/cash register system. The control center is also for controlling dispensers with card readers/cash acceptors that are manufactured by different manufacturers. The control center operates like a peripheral device to the computer/cash register with an external version having serial connection and an internal version having bus connection. More particularly, the control center of the '326 patent controls the flow of data between different brand fuel dispensers and the computer/cash register having the same application software program. The control center is limited in its ability for use as a retrofit of older generation (legacy) point-of-sale (POS) transaction systems. In particular, the control center is limited with regard to an increased functionality of newer generation fuel dispensers.

Dispenser manufacturers generally have a proprietary communication protocol for communicating between a respective dispenser and a site controller (site forecourt controller). Certain dispenser manufacturers utilize current loop communications, while others utilize voltage level communication, and a combination thereof. Prior known fuel dispenser interface devices include a pump interface board (PIB), such as is manufactured by Wayne Division, Dresser Equipment Group, Inc. of Austin, Tex. Other devices known in the art include a PAM by Gilbarco and a SAM by Tokheim.

The existing pump interface devices provide a high level interface between a site forecourt controller and a dispenser. In a such a high level interface, many of the communication details needed to correctly configure and operate a fuel dispenser are hidden from the site forecourt controller device. The site forecourt controller is presented with a superset of dispenser commands that simplify the dispenser operation. For example, with the PIB by Dresser Wayne, approximately thirty-eight (38) commands are available to the site forecourt controller to interact with the pump section of the fuel dispensers. These commands include reading/writing prices per grade of fuel, read dispenser sale values, start a dispenser, stop a dispenser, etc.

In older generation (legacy) fuel dispenser interfaces, there are command set conversions and protocol conversions occurring with only limited speed conversions. Sometimes these conversions relate only to the pump interface, sometimes to the customer access terminal (CAT), and sometimes both. The older generation fuel dispenser interface products typically provide a 1200 to 9600 baud interface to the site forecourt controller and a 9600 baud interface to a respective dispenser.

With the advances in technology, newer generation fuel dispenser models often have some form of advanced customer access terminal (CAT). A CAT includes one or more of the following devices consisting of card readers, bill acceptors, input keys for selecting the type of payment or fuel desired, a display for prompting the customer, and a printer for printing a receipt of fuel dispensed. Card readers facilitate reading credit, debit, or other types of payment cards. Bill acceptors are used in accepting dollar bills for the fuel to be dispensed. The newer generation fuel dispensers accordingly include increased functionality over older generation fuel dispensers.

What is needed, therefore, is a method and apparatus for enabling a fueling retail site to upgrade to newer generation fueling dispensers having increased functionality without requiring a change-out of a legacy POS system.

SUMMARY

According to one embodiment, a retail petroleum station site architecture includes at least one point-of-sale (POS) controller, the POS controller providing at least one of the following functions selected from the group consisting of cash register, dispenser control, transaction card processing, and bar code scanning of stocked articles. The site architecture further includes at least one new generation fuel dispenser having a customer access terminal (CAT) and a dispenser control unit. The new generation fuel dispenser has at least one feature which is unsupported by the POS controller, wherein the unsupported feature includes at least one of either a customer access terminal control function or a dispenser control function of the new generation fuel dispenser. Lastly, the site architecture includes a site forecourt controller coupled between the POS controller and the new generation fuel dispenser. The site forecourt controller includes means for interfacing the POS controller with the new generation fuel dispenser. The interfacing means provides a protocol and electrical signal interface between a first protocol and electrical signal requirement of the POS controller and a second protocol and electrical signal requirement of the new generation fuel dispenser.

A principal advantage of this embodiment is that existing and newly constructed gasoline stations can render installation of new generation fuel dispensers having high speed interfaces. The present embodiments provide a mechanism for backward compatibility, facilitating introduction of new generation fuel dispensers into an existing fueling station without requiring a change-out of a legacy POS site controller system. Advanced features and functions provided by new generation fuel dispensers can immediately be incorporated into the operation of a pre-existing fueling station.

DETAILED DESCRIPTION

Figure 1:
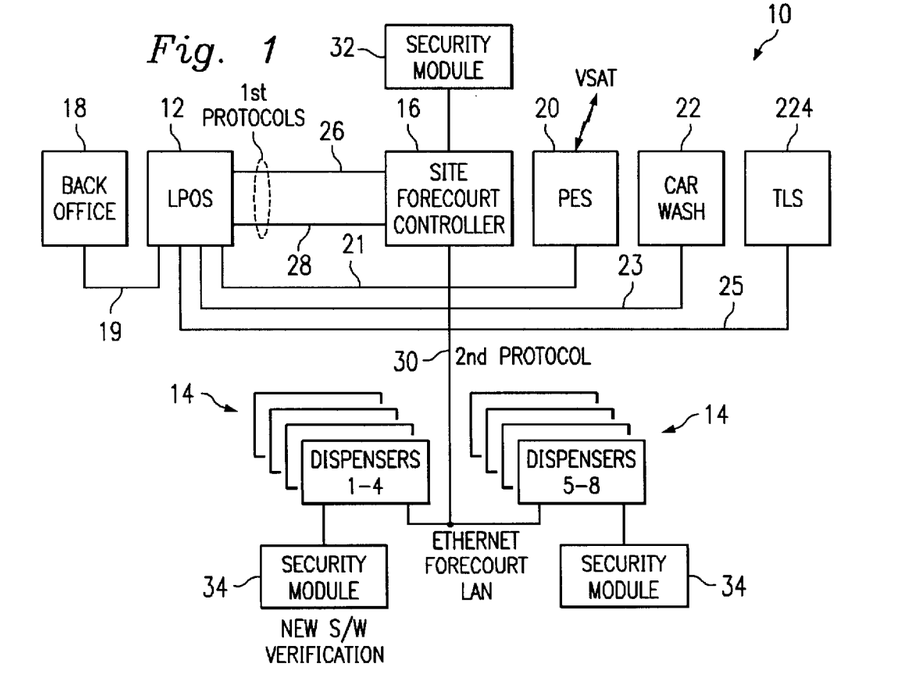
FIG. 1 illustrates a block diagram view of a site architecture migration of a legacy POS controller with new generation dispensers according to the embodiments of the present disclosure.

Referring now to FIG. 1, a retail petroleum station site architecture 10 provides for migration of a legacy point-of-sale (LPOS) controller 12 with new generation fuel dispensers 14 according to the embodiments of the present disclosure. A site forecourt controller 16 couples between the LPOS controller 12 and the new generation fuel dispensers 14 for interfacing the LPOS controller with the dispenser. Also included in the site architecture 10, various other units interact and couple with the legacy POS controller 12.

A back office unit 18 communicates with the LPOS controller 12 via a communication link 19, as necessary, for conducting a prescribed back office functionality. A personal earth station (PES) 20 communicates with the LPOS controller 12 via communication line 21 for handling prescribed activities relating to the PES 20 and satellite communications (VSAT). Other units include a car wash 22 and a tank level system (TLS) 224 that communicate with LPOS controller 12 via communication links 23 and 25, respectively. Communications links 19, 21, 23, and 25 each include, for example, an RS-232 serial communications link.

As mentioned, site forecourt controller (SFC) 16 couples between the LPOS controller 12 and the new generation fuel dispensers 14. More particularly, site forecourt controller 16 couples to the LPOS controller 12 via first and second communication links, 26 and 28, respectively. The LPOS controller 12 provides at least one function which may include cash register, dispenser control, transaction card processing, and/or bar code scanning of stocked articles.

Site forecourt controller 16 couples to dispensers 14 via communication link 30. Dispensers 14 can be arranged in one or more groups or islands of dispensers, for example, dispensers 1–4 and dispensers 5–8. Security modules, 32 and 34, facilitate and provided for prescribed verification and authentication requirements at the site forecourt controller 16 and dispensers 14, respectively. While not illustrated, a security module 34 is provided for each of the dispensers 14.

As will be discussed in further detail, a site installation of the new generation dispenser system includes a SFC applications server, an Ethernet LAN, a prescribed number of new generation fuel dispensers, at least one POS terminal, and an optional local service terminal (LST). The LST connects to the SFC via a standard serial communications port. The LST provides access to operational status, error event logs, and printing of information when equipped with a printer. The LST may also initiate diagnostic tasks within any dispenser or the SFC, and capture and display the results. In one embodiment, the LAN includes a 10 Base-T Ethernet LAN.

Referring still to FIG. 1, security modules 32, 34 provide protection of data and software/firmware programs from unauthorized changes, accordingly maintaining a prescribed level of system integrity and protection from fraud. Protection is further provided by incorporating an encrypted digital signature (such as DES or other suitable encrypted digital signature) to all downloadable software as the software are prepared for downloading. A firmware authentication code (FAC), including a suitable hashing algorithm, provides additional protection. A dispenser manager (DM) of a given fuel dispenser validates the digital signature during a firmware download process and prior to a corresponding switchover. In one embodiment, multilevel security access codes control access to secure information within a given dispenser via a respective security module (32, 34) or other suitable means.

Figure 2:
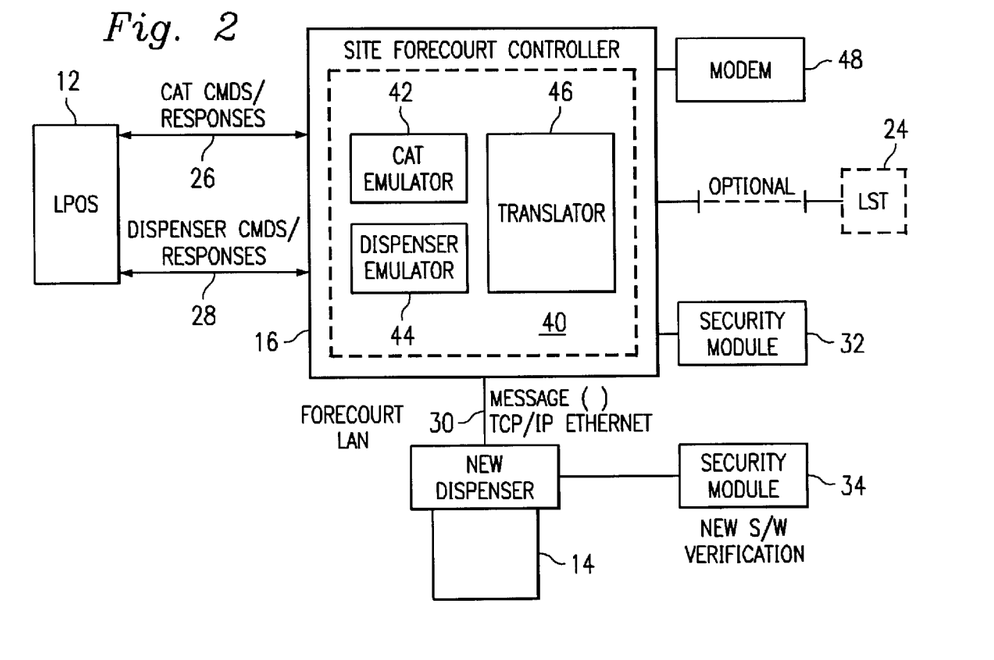
FIG. 2 illustrates a simplified block diagram view of a site architecture migration of a POS controller with new generation dispensers according to the embodiments of the present disclosure.

Turning now to FIG. 2, a simplified block diagram view illustrates the site architecture migration of a POS controller with new generation dispensers according to an embodiment of the present disclosure in greater detail. In particular, the site forecourt controller 16 includes means for interfacing the LPOS controller 12 with the new generation fuel dispenser 14. The interfacing means 40 provides a protocol and electrical signal interface between a first protocol and electrical signal requirement of the LPOS controller 12 and a second protocol and electrical signal requirement of the new generation fuel dispenser 14. The interfacing means 40 includes a customer access terminal emulator 42, a dispenser emulator 44 and translator 46. A modem 48 coupled to the site forecourt controller 16 provides an external link for additional communication, as discussed further herein.

The customer access terminal emulator 42 responds to the LPOS controller 12 for translating a first set of legacy POS customer access terminal commands received from the LPOS controller 12 into a second set of POS customer access terminal commands, the second set of POS commands being suitable for use by a customer access terminal of the new generation fuel dispenser 14. The second set of POS customer access terminal commands include suitable commands for handling a customer access terminal control function of at least one feature which is unsupported by the LPOS controller 12. The customer access terminal control function of at least one feature that is unsupported by the LPOS controller 12 may also include a serviceability function. The customer access terminal emulator 42 is further responsive to the customer access terminal of the new generation fuel dispenser 14 for translating a second set of POS CAT messages received from the customer access terminal of the new generation fuel dispenser 14 into a first set of legacy POS CAT messages suitable for use by the LPOS controller 12.

Referring still to FIG. 2, the dispenser emulator 44 responds to the LPOS controller 12 for translating a first set of legacy POS dispenser control commands received from the LPOS controller 12 into a second set of POS dispenser control commands suitable for use by a dispenser control unit of the new generation fuel dispenser 14. The second set of POS dispenser control commands include suitable commands for handling a dispenser control function of the at least one feature which is unsupported by the LPOS controller 12. The dispenser control function of at least one feature that is unsupported by the LPOS controller 12 may also include a serviceability function. The dispenser emulator is further responsive to the dispenser control unit of the new generation fuel dispenser 14 for translating a second set of POS dispenser control messages received from the dispenser control unit into a first set of legacy POS dispenser control messages suitable for use by the LPOS controller 12.

In one embodiment, the first protocol includes two asynchronous serial communications protocols and the electrical signal requirements include RS232 and RS485. The second protocol and electrical signal requirement includes at least one of FTP, HTTP, TCP/IP and an Ethernet LAN.

Figure 3:
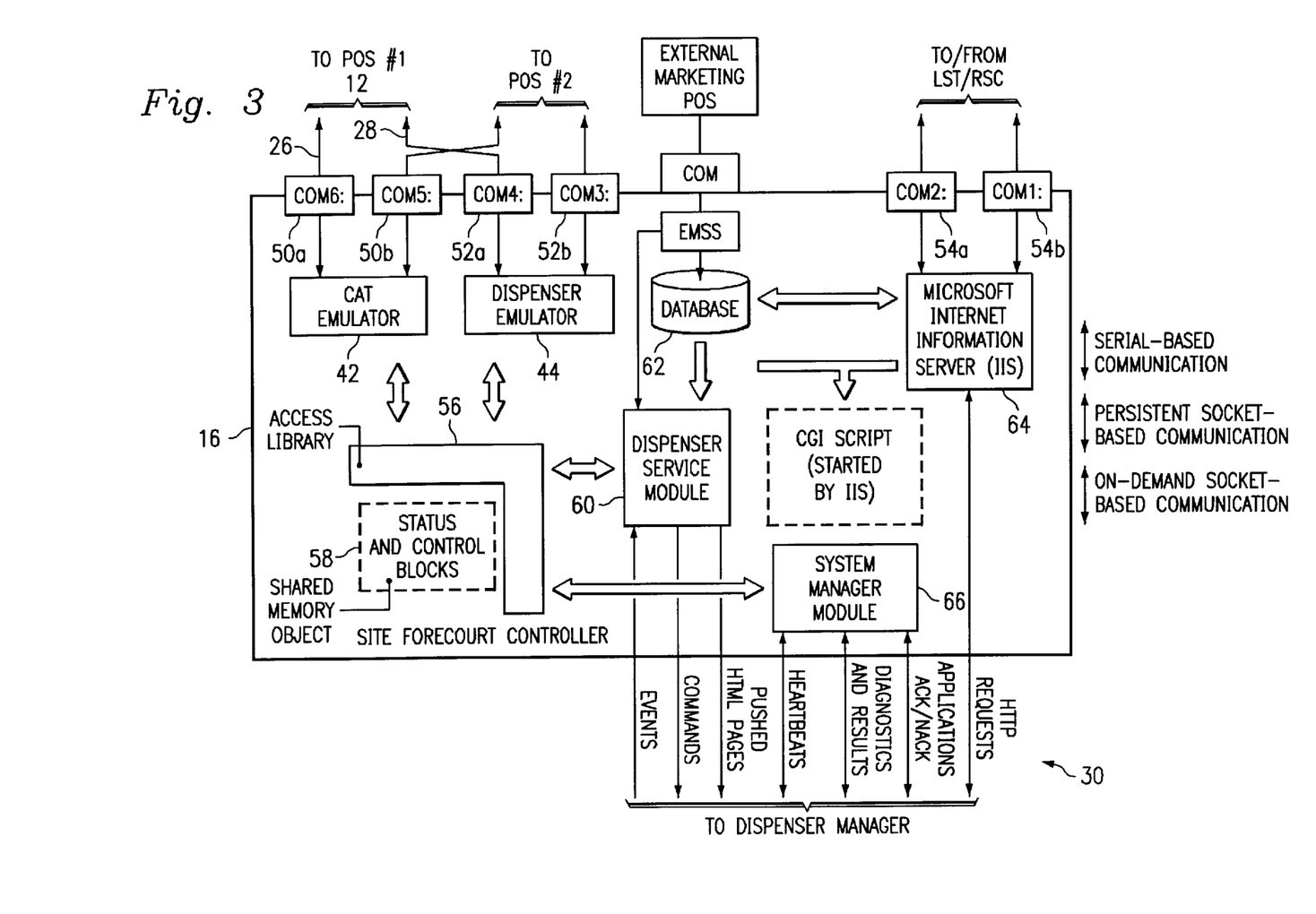
FIG. 3 is a functional block diagram view of a site forecourt controller of FIGS. 1 and 2 in greater detail.

FIG. 3 is a functional block diagram view of a site forecourt controller and applications architecture of the present embodiments in greater detail. The major elements of site forecourt controller 16 include a CAT emulator or virtual CAT 42, a dispenser emulator or virtual dispenser 44, a shared memory object 58, a dispenser service module 60, an Internet Information Server (IIS) 64, a system manager module 66, and a database 62. Database 62 can include a single database or more than one as database as may be required for a particular retail site architecture. In one embodiment, database 62 includes at least one of the following databases selected from an HTML page database, an error log database, a software database, and a configurations template database.

In one embodiment, site forecourt controller 16 can be functionally coupled to at least two different POS controllers via respective communications ports 50a, 52a and 50b, 52b. Communications ports 54a, 54b facilitate external communications, such as, modem communication to a remote service center (RSC) and a direct connection to an optional LST 24. The customer access terminal emulator 42 and the dispenser emulator 44 are operatively coupled to an access library 56 and the shared memory object 58 (e.g., status and control blocks). The dispenser service module 60 is operatively coupled between the access library 56, shared memory object 58, and database 62. Dispenser service module 60 is operatively coupled to dispensers 14 via communication link 30. Still further, dispenser service module 60 is operatively coupled to an external marketing system service or server (EMSS), wherein the EMSS is operatively coupled to an external marketing POS terminal (not necessarily located at a particular retail petroleum station site).

The Internet Information Server 64 is operatively coupled between the database 62 and communication ports 54a, 54b. The Internet Information Server 64 is also operatively coupled to dispensers 14 via communication link 30. System manager module 66 is operatively coupled to the access library 56 and shared memory object 58. System manager module 66 is also operatively coupled to dispensers 14 via communication link 30.

In one embodiment, the SFC 16 includes a Microsoft Windows NT server platform. Note that other operating systems, such as Linux, could also be used. The SFC performs the function of site controller and HTML page server to the dispensers. The SFC also provides the logical interface and transaction conversion between the new generation fueling dispensers and legacy POS (LPOS)controller devices. Accordingly, a LPOS is able to communicate with a new generation fuel dispenser system as if communicating with a prior generation dispenser. The design of the SFC facilitates future implementation of additional dispenser protocol between a legacy POS and a dispenser manager.

With the SFC 16 of FIG. 3, the new generation dispensers 14 are each capable of performing all necessary functions to prompt a consumer through a purchase, including cash, credit, debit, and coupon transactions, to deliver product, print loyalty coupons, and collect payment, credit, debit, or cash tender. In the event of the loss of the SFC 16 or LPOS 12, individual dispensers may still be manually authorized to dispense fuel.

Figure 4:
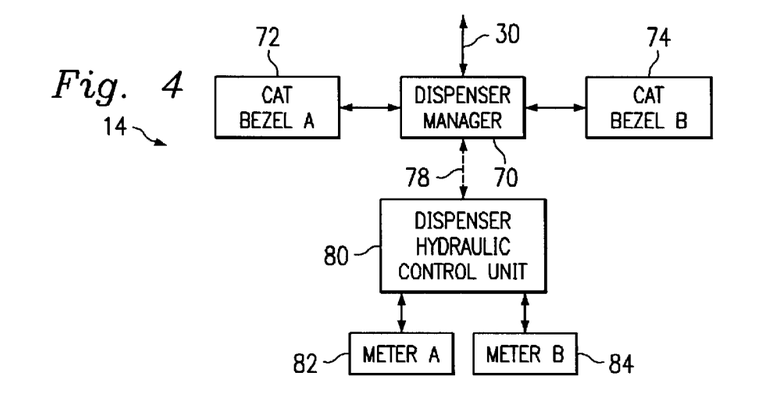
FIG. 4 illustrates a block diagram view of customer access terminal and dispenser control of a new generation dispenser.

FIG. 4 illustrates a block diagram view of the customer access terminals and dispenser control unit of a new generation dispenser 14. Each of the new generation fuel dispensers 14 include at least one customer access terminals (CAT) (72, 74), a dispenser manager (DM) 70, and a dispenser hydraulic control unit 80. In addition, the new generation fuel dispenser 14 includes capabilities of at least one feature that is unsupported by the POS controller 12. The at least one unsupported feature includes at least one of either a customer access terminal control function or a dispenser control function of the new generation fuel dispenser 14.

Communication link 30 operatively couples to dispenser 14 at the dispenser manager 70. Dispenser manager 70 operatively couples to CAT bezel 72 and CAT bezel 74 and dispenser hydraulic control unit 80. Dispenser hydraulic control unit 80, also referred to herein as a global electronics module (GEM), controls fuel storage tank pumps and fuel flow control valves (not shown) and monitors fuel flow information via metering and reporting subsystems (82,84). Other details have been omitted for the purpose of clarity.

Each dual fueling point dispenser control system includes an environment of multiple distributed microprocessors in which each microprocessor performs a real-time dispenser function. The processor systems include, but are not limited to, multiple fuel metering and reporting subsystems, a dispenser manager (DM), and a fuel dispensing control system for a given dispenser. Each of these processor systems performs specific tasks to assure reliable operation of the dispenser.

The logical interfaces to the various control elements of the dispenser are as follows. The dispenser manager (DM) 70 interfaces the dispenser 14 to the SFC 16 via the Ethernet LAN 30. All consumer I/O devices are mounted on a customer access terminal (CAT) bezel (72, 74) and connect directly to the DM 70. The DM 70 also interoperates with the GEM 80 to deliver commands and to receive response data and status from it. The DM issues commands to the GEM 80 over an internal communication link 78 of a given dispenser. Control, status, and data are also exchanged over the internal communication link 78.

The DM 70 drives the graphics display on each of the two CATs and executes a browser task. The browser and the web server of the SFC 16 provide the principle interface with the consumer. The consumer uses the I/O devices of the dispenser as prompted by the HTML pages appearing on the display.

The GEM 80 controls all hydraulic elements of the dispenser, including an optional active vapor recovery system and proportional valves, as necessary to carry out a fuel-dispensing scenario. The GEM 80 also drives sale progress displays of the dispenser.

In addition, the DM 70 of a given dispenser collects and maintains status of all dispenser devices and reports status information to the SFC 16. The DM decodes POS commands received via SFC 16 and executes the corresponding dispenser commands. The DM collects all responses to data link commands and forwards them to the SFC 16. The DM delivers HTML pages to a given display unit of the dispenser. The DM also reports to the SFC the occurrence of any "significant event" detected within the GEM, the metering and reporting subsystems, or the DM.

In one embodiment, the DM 70 is a Windows™ thin client to the SFC 16. The SFC communicates with the DM via a permanent TCP socket. Each device connecting to the DM is accessed directly through its device address. Devices include all consumer I/O devices on the dispenser bezels, the metering and reporting subsystems, and the GEM. The DM supports Ethernet and other communication access devices within a given dispenser. The DM 70, in cooperation with the SFC 16, manages all functions of the dispenser 14.

Data elements transmitted to the dispensers 14 from the SFC 16 can comprise HTML pages, bit-map images, printer images, applications firmware, configuration templates, diagnostic firmware downloads, and GEM and bezel commands. Data transmitted to the SFC 16 from the dispensers 14 include encoded soft key events, data packets containing card read data, bill acceptor data, barcode read data, dispenser state and status data from GEM, error and event logs from GEM, and diagnostic program results.

Figure 5:
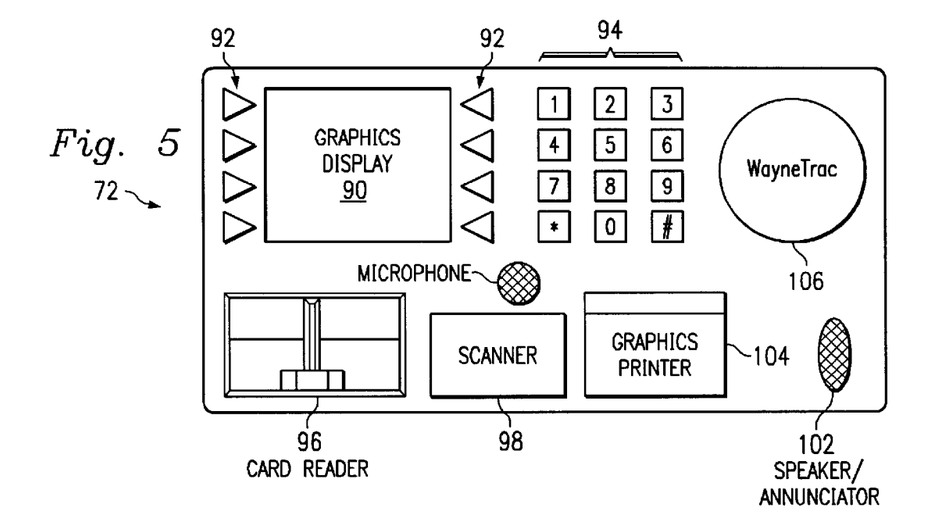
FIG. 5 illustrates an exemplary dispenser bezel of a new generation dispenser.

FIG. 5 illustrates an exemplary customer access terminal (CAT) dispenser bezel of a new generation dispenser 14, for example, bezel 72. The DM 70 controls the devices on each dispenser bezel in response to the SFC commands. While not explicitly shown, a bezel is associated with each fueling point of the dispenser and contains all consumer accessible devices necessary to initiate and pay for a fuel sale. A central feature of the dispenser bezel 72 is a graphics LCD display 90. The LCD display can display HTML pages and other information as sent from the SFC server.

In one embodiment, bezel 72 includes soft key switches 92 disposed proximate the sides of the display 90. The soft key switches 92 enable a consumer to make selections from the particular options displayed on the LCD display 90 at any given time. In addition, a 12-digit keypad 94 provides for a general manual entry of data, as well as for secure entry of a consumer's personal identification number (PIN), such as may be required for a debit transaction. The keypad 94 preferably includes a tamper resistant security module (TRSM), such as security module 34, which provides for encryption of PINs prior to delivery to the DM 70.

When applicable, in response to prompts from the SFC 16, a consumer enters his PIN required for a debit sale. During this process, the SFC places the keypad 94 in a 'secure' state. While in the 'secure' state, the keypad 94 receives and holds each of the keystrokes until the 'enter' key is pressed. Furthermore, a keypad processor (not shown) processes the entered PIN and performs a POS-defined operation with the personal account number. The keypad 94 then proceeds to encrypt the resulting data field using a suitable encryption key. Cipher text data is then transmitted to the SFC 16 where it remains until requested by the LPOS 12.

A card reader 96 provides for the reading of transaction, consumer credit or debit cards. A consumer follows graphic prompts on the LCD display 90 to enter and withdraw the card, or may do so spontaneously. The card reader 96 reads the card on insertion (or withdrawal) and validates the data. If valid data is found, card reader 96 transfers the data to a data buffer and onto SFC 16. Furthermore, card reader status is reported to the DM 70 according to a prescribed protocol. An optional barcode scanner 98 reads barcode labels, such as may be found on promotional coupons.

Bezel 72 may also contain an audio speaker 102 and a soft key call button that is assigned by the DM. When a consumer signals a service station attendant by pushing the call button, the attendant responds through the established intercom system to speak to the fueling point. The particular conversation will continue until the attendant breaks the connection. The audio speaker 102 also provides signaling audio such as beeps, and voice annunciation.

A receipt printer 104 includes, for example, a thermal contact printer for printing receipts, or other records, on temperature sensitive paper. The POS 12 generally provides the contents of a receipt. At the conclusion of printing, the printer extends the paper for removal by the consumer. In addition to printing the fueling transaction receipt, the printer may be used to print a bar-coded loyalty coupon or other information, as appropriate. Lastly, a radio frequency identification device (RFID) sensor 106 is provided within bezel 72. The RFID sensor 106, when active, senses the presence of a radio frequency identification device. Such an RFID device may include a small RF transponder device which, when energized by an RF signal, responds with its identification number. The RFID device may be used, for example, to facilitate credit purchase transactions.

As discussed, the consumer interface of the new generation dispenser includes a graphics display and the soft keys (e.g., on the order of eight (8) soft keys) associated with it. A dispenser browser resident within the dispenser manager 70 receives and renders an HTML page and delivers it to the display for presentation to the consumer. The consumer may respond to a prompt by striking one of the soft keys, or by entering data via one of the other I/O devices on the bezel (such as a card reader, barcode scanner, bill acceptor, a 12-key keypad, or other input device).

A consumer may also spontaneously create an event by removing a nozzle, inserting a card in the card reader, or using an RFID device, etc. These events are reported to the SFC dispenser service module (DSM) 60 for action (FIG. 3). Typically, the action would call the SFC 16 to push an HTML page to the dispenser 14 to continue the dialog with the consumer. Alternatively, the DSM 60 actions could report the event to the remote service center, or initiate an application task to perform some other specific function. For example, if the consumer had chosen a special fuel grade selection from the HTML presentation, the immediate feedback will be delivered to the consumer confirming the key selection and the fuel grade and the sale price selected. This new page may ask for confirmation of the selection and advise that the requested action will be undertaken. It may also provide other soft keys for selection of other products or services.

Figure 6:
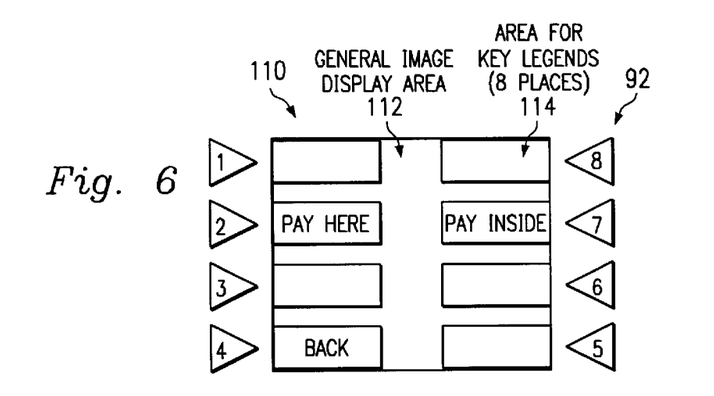
FIG. 6 illustrates an exemplary HTML page layout in conjunction with soft keys of the dispenser bezel of FIG. 5.

FIG. 6 illustrates an exemplary HTML page layout 110 in conjunction with soft keys 92 of the dispenser bezel 72 of FIG. 5. The HTML page layout includes a general image display area 112 and an area for key legends 114. In one embodiment, the area for key legends is provided in eight places proximate respective soft keys 92.

The present embodiments accordingly reflect a new generation dispenser control system based upon non-proprietary standards and open systems architecture. As discussed, the dispenser control system includes a site forecourt controller (SFC) 16. In one embodiment, the SFC operating system is a Windows NT server operating system executing in a standard and expandable environment. The dispenser control system also includes fueling dispensers 14 each having a dispenser manager 70 (FIG. 4). In one embodiment, the DM 70 operates as a thin client operating under the Windows CE operating system. The software and specifications for both operating systems are readily available from Microsoft Corporation of Redmond, Wash. Note that other suitable operating systems may be used also.

Further in connection with the present embodiments, the TCP/IP communication protocol and the Ethernet LAN technology provide high-speed communication between the SFC 16 and the DMs 70. In addition, a suitable communication link provides for fast and efficient communications between major subsystems of a new generation dispenser 14. TCP/IP and Ethernet LAN technologies conform to international standards and are widely used around the world and thus only briefly described herein. Ethernet is widely used in information systems. The new generation dispenser 14 brings together these various technologies to achieve a superior and cost effective product.

According to the embodiments of the present disclosure, the electronics and control subsystems of the dispenser control system deliver extensible, scalable and flexible services. New technology and processing power may be added to existing retail fueling station systems as new services are introduced. For example, in connection with new generation fueling dispensers, a prescribed form of web browser operates in each dispenser operating system (OS). The web browser provides the ability to process and display HTML pages "pushed" by the SFC 16. The HTML pages are pushed in response to any one of the following that may include legacy POS commands, service terminal commands, and/or third party marketer system commands.

The SFC 16 controls operation of the new generation fuel dispensers 14 by offering a set of specific options to a consumer via the HTML pages "pushed" to the display 90 at a given dispenser. The consumer is accordingly allowed to "request" that a particular function be executed by the dispenser, such as accepting a credit card for payment or authorizing dispensing a particular grade of fuel. In one instance, the action of the consumer striking one of the soft keys, initiates a desired function, referred to as a "soft key event". Inserting a card in the card reader results in a "card reader event" or removing a nozzle results in a "nozzle out-of-boot event," etc. In this manner, the consumer signals his intentions to the point of sale (POS) dispenser control system. A finite number of events can thus be created, some which may be "illegal" in the context of a particular HTML page being displayed. The illegal events are processed according to an appropriate "illegal event" exception handling policy of the POS dispenser control system 12. The "legal" events will be processed to initiate the desired operations at the dispenser or within the SFC 16.

If an event is intended to trigger a task at a given dispenser 14, the SFC 16 issues an executable command to the dispenser manager (DM) 70. For example, an HTML page displayed at a dispenser 14 might permit the consumer to access a local weather report HTML page, which had been previously downloaded into the HTML database 62 of the SFC 16, by striking a given soft key, for example, soft key "SK1." The SFC 16 receives the SK1 event from the DM web browser, and invokes the server task that proceeds to issue a request to the HTML database. The weather HTML page is accessed and "pushed" to the dispenser for display. The dialog between the consumer at the dispenser and the SFC server continues in this manner until disconnection by the consumer or termination by the SFC. A maximum possible number of simultaneous browser sessions at a given site will equal the number of installed dispenser fueling points having such capability.

According to the present embodiments, a legacy POS terminal interface includes a dispenser emulator task 44. The dispenser emulator task of the SFC interfaces with LPOS terminal 12 and emulates the dispenser interface for which the LPOS terminal was designed. The emulation provides transparent interaction with the new generation fueling dispenser system and the LPOS 12, as well as the attendant. The CAT emulator task 42 translates textual LPOS consumer prompts into corresponding new generation fueling dispenser HTML text/graphic pages, and translates consumer responses into legacy responses understood by the LPOS.

Further with respect to the legacy POS interface, the SFC services the LPOS systems (e.g., a Nucleus POS system available from Wayne Division, Dresser Equipment Group, Inc. of Austin, Tex.) and performs the necessary translation between the LPOS and the dispensers. A key feature of the SFC 16 is that the SFC presents an interface to the LPOS indistinguishable from the interface presented by a standard LPOS interface board/customer access terminal interface. The SFC 16 translates incoming LPOS commands and translates returning dispenser responses. The SFC 16 also displays HTML promotional pages at a prescribed dispenser during the fueling time. The DM 70 and SFC 16 system are capable of managing, prompting and addressing workflow control at a dispenser. Only transactional data and console control information will pass to the LPOS system 12. In one embodiment, a maximum of 32 fueling points can be serviced through the SFC 16.

For POS command translation, the SFC translates LPOS commands and prompts into HTML prompts for the new generation dispenser control system graphical interface. To achieve this, the SFC 16 drives CAT emulator 42 and dispenser emulator 44 and interprets each LPOS command (or a sequence of commands) and delivers a corresponding HTML page or command to the appropriate dispenser.

For dispenser response translation, the SFC 16 translates and reports consumer responses to the HTML pages into the legacy formats expected by the LPOS 12. The SFC 16 controls response timing to assure complete compatibility with the LPOS. In one embodiment, the SFC responds within 50 ms maximum of expected time to a command or poll and maintains a cumulative poll cycle less than 500 ms of normal.

The SFC 16 furthermore does not respond too quickly, which may cause a problem in the LPOS 12. In any event, an LPOS operator should not perceive a difference between the SFC and the predecessor pump interface board (PIB), nor should the system performance be compromised.

The SFC 16 services the dispenser manager (DM)s 70 of respective fueling dispensers 14 as an asynchronous web server using the Ethernet, Transport Control Protocol/Internet Protocol (TCP/IP), HyperText Transport Protocol (HTTP), and File Transfer Protocol (FTP) protocols. The SFC server 60 maintains the state and transaction status for each dispenser. Movement between dispenser states is driven by events occurring at the dispenser and by the application programs running under the web server. The SFC 16 confirms all event-initiated state changes of the dispensers. In addition, the SFC server 60 reconciles the state and status maintained by the server with the actual dispenser condition (e.g., on a prescribed periodic basis). The HTTP protocol is used to deliver HTML pages to the DM 70 and FTP protocol is used to receive equipment status and responses to commands, and to deliver commands to the DM 70.

In addition to the HTML pages necessary to invoke the LPOS functions, the SFC 16 may present promotional HTML pages to a given fuel dispenser. The promotional pages can be presented during idle time preceding and during the time fuel is being dispensed. A consumer browses through on-site promotional material or information, or receives a sequence of pages and purchase options 'pushed' by a local or remote promotional (Promo) system, or external marketing system service or server (EMSS). Promo time is terminated at completion of the fueling transaction or at termination of the current page display period. In one embodiment, promotional pages are pre-installed at the SFC 16 for selective delivery to a DM 70 for display. These pages are downloaded from a HTML page source that may be either local, or remote, via a serial communications port. The downloaded promotional pages contain authentication codes, which are tested by the SFC 16 to verify authenticity thereof.

In one embodiment, the fueling point receipt printer prints textual and graphical promotional material, such as graphics and barcodes, according to prescribed Promo system directives. As is the case of the HTML pages, the print objects are also previously downloaded and authenticated. Print objects may be selected from the promo print data base, variable data added to specified fields of the objects, and the print image queued for printing at the close of the sale by the POS 12. In one embodiment, the Promo image is placed at the end of the receipt.

The functions of the new generation fuel dispensers are controlled by cooperation between SFC software and DM firmware. The dispenser manager firmware includes I/O drivers, Wherein the I/O drivers receive I/O inputs or send I/O outputs under interrupts to and from devices on the internal communication link. A watchdog task monitors the DM execution, wherein the watchdog task runs at the lowest priority scheduled by a WD timer event, typically several seconds. A DM browser display process interprets and displays the HTML pages pushed to it. In one embodiment, the browser is equivalent to the Microsoft Internet Explorer.

A DM command communications task communicates with the SFC, sends I/O events, and receives I/O events (including GEM, metering and reporting subsystems, etc. commands). The command communications task also receives and responds to "Pings" from the SFC, as well as reports watchdog events to the SFC. The command communications task further receives diagnostics/file download/ configuration commands from the SFC and opens those applications on the DM side. Diagnostics/download/ configuration tasks are opened by the command communication task and closed when completed.

A file download task downloads application and OS files into a flash memory while the DM is operating in an on-line mode. During the download process, an authentication task is initiated to calculate a firmware authentication code (FAC) to authenticate each block of data. The SFC triggers a transfer to new executable code at an appropriate time, wherein the SFC commands the DM to reboot. Diagnostic tasks receive diagnostic commands from the SFC for performing different level tests on a given dispenser, such as extracting exception event logging and reporting logged built-in-test data, etc. A configuration task transfers dispenser templates, data structures and default settings to a given dispenser.

Figure 7:
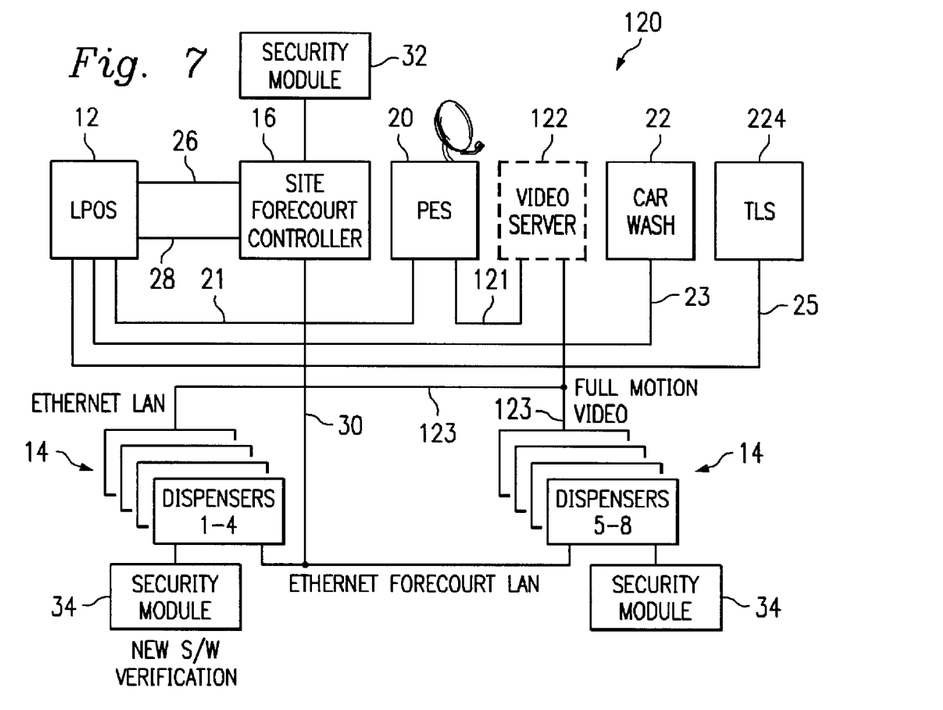
FIG. 7 illustrates a block diagram view of a site architecture migration of a POS controller with new generation dispensers and a video server according to another embodiment of the present disclosure.

FIG. 7 illustrates a block diagram view of a site architecture migration of a POS controller with new generation dispensers and a video server according to another embodiment of the present disclosure. The site architecture 120 of FIG. 7 is similar to that of FIG. 1, however, a video server 122 is coupled between the personal earth station 20 and the dispensers 14.

The video server 122 couples to the personal earth station via a communication link 121. Communication link 121 may include an RS-232 serial or other suitable communication link. The video server 122 couples to dispensers 14 via communication link 123. The communication link 123 includes, for example, a 100 mb/s Ethernet link or other high-speed communication link suitable for communication of a digital video signal. Note that communication link 30 and communication link 123 may be the same.

The personal earth station 20 facilitates communication of digital video, credit/debit card information, electronic mail, and other suitable information to and from the site architecture 120. With respect to video server 122, it provides a digital video signal to respective ones of dispensers 14 according to the operational programming scheme implemented at the particular retail petroleum site.

With the embodiment of FIG. 7, the site architecture allows for delivery of digital video at the dispensers using MPEG-2 or other suitable compression algorithm. In such an instance, video server 122 connects to the Ethernet and responds to commands from the SFC to deliver data streams to the 100 mb/s Ethernet LAN network, for routing the data system to the appropriate dispenser DM. Security of the video clips is achieved in a manner similar to the HTML pages, in that, each video clip contains an authentication code validated by the SFC.

The SFC 16 also responds to requests from the Promo system to deliver a specified video clip to a given fueling point. Input devices at the dispenser are active during a Promo period. In response to an event occurring during the Promo period, the SFC captures the event and forwards the same to the Promo system.

The video server 122 includes a RAM data buffer for each active fueling point display, one or more high-speed random access primary video storage media, and a dedicated control program. To support this feature, each new generation dispenser includes a graphics LCD video display, an MPEG-2 decompression device, audio and video drivers for each fueling point, and appropriate supporting application and system software.

The 100 mb/s Ethernet LAN provides the means for communicating between the dispensers 14 and the SFC 16. The 100 mb/s Ethernet LAN also provides for delivery of the compressed full motion digital video stream from the video server 122 to the dispensers 14.

Figure 8:
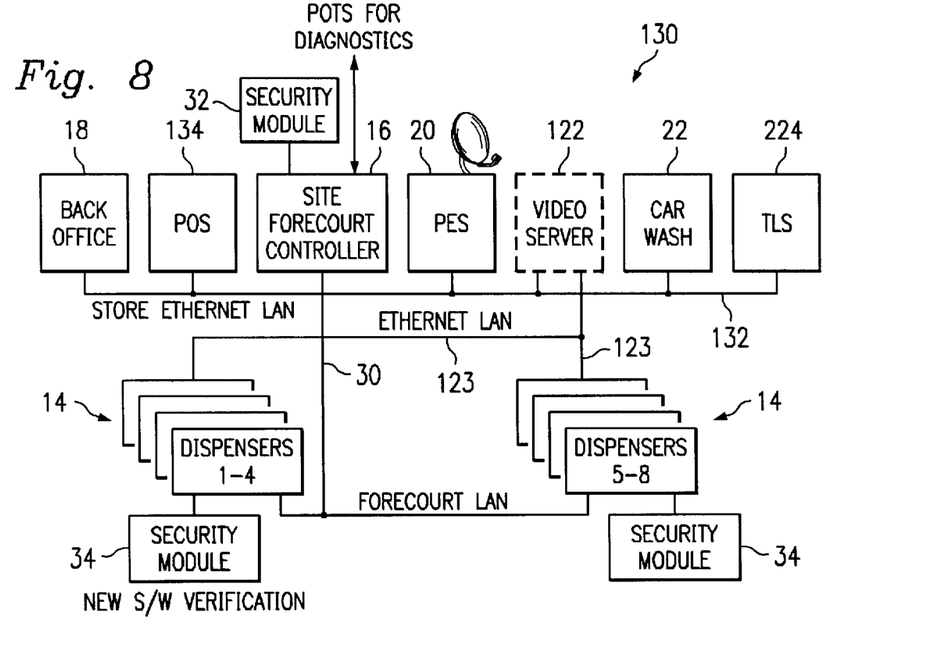
FIG. 8 illustrates a block diagram view of a site architecture migration of a POS controller with a video server and new generation dispensers according to another embodiment of the present disclosure.

FIG. 8 illustrates a block diagram view of a site architecture migration of a POS controller with a video server and new generation dispensers according to another embodiment of the present disclosure. The site architecture 130 of FIG.

Figure 9:
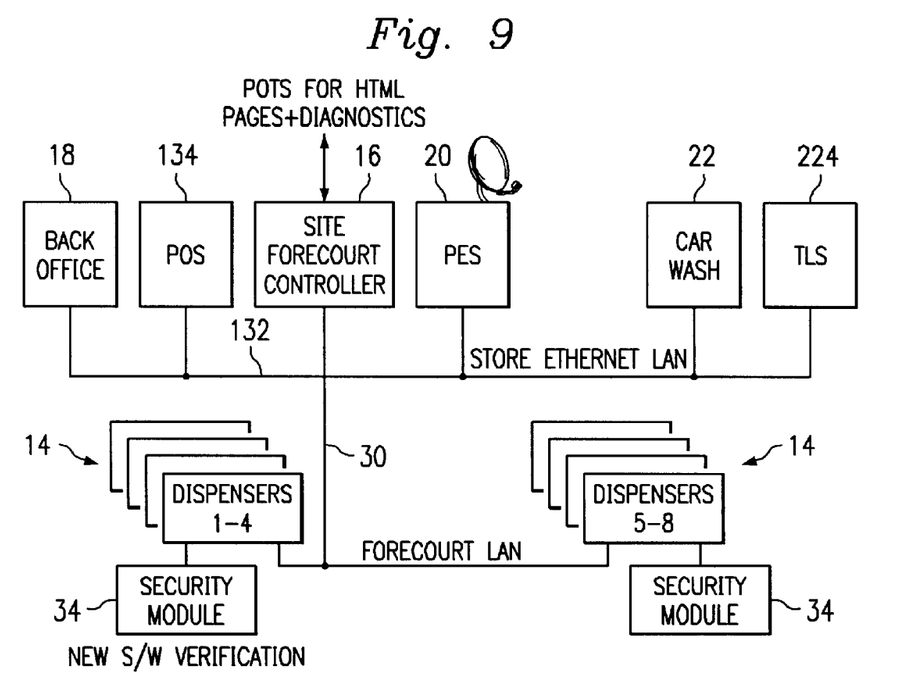
FIG. 9 illustrates a block diagram view of a site architecture migration of a POS with new generation dispensers absent a video server according to another embodiment of the present disclosure.

8 is similar to that of FIG. 7, however, the various units, including a new generation POS 134, are coupled to the site forecourt controller 16 via a high-speed local area network 132, such as an Ethernet LAN. FIG. 9 illustrates a block diagram view of a site architecture 130 migration of a POS with new generation dispensers similar to the architecture of FIG. 8, however, absent a video server. With reference to new generation POS devices, the virtual CAT 42 and virtual dispenser 44 act as pass-through devices.

As discussed herein, the SFC is provided with suitable software for handling various tasks. One task is HTTP Service. HTTP Service receives requests from the RSC or optional LST in FTP/HTTP protocol. HTTP Service sends the current dispenser data from any selected dispenser, in either text or HTML format to the RSC or optional LST port. It can also download a new HTML promotion file. Additionally, HTTP Service can instruct the DM to open diagnostic, download, or configuration task(s), open appropriate tasks at the SFC side and send information from the RSC or optional LST to those tasks and/or send HTML pages to the DM. The HTTP Service can also send HTML pages automatically (server push) to the selected DM based on current dispenser status and DM I/O events. The SFC may automatically report messages to the RSC or optional LST during normal SFC operation. The HTTP Service may also be used to download promotional HTML pages.

An SFC dispenser service task 60 is an application task to the TCP transport layer for communicating to the DMs, receive current I/O events, update dispenser status and data buffer, and to push HTML pages to the DM. The SFC dispenser service task sends command information to the DM and facilitates prescribed diagnostic/download/configuration tasks, as may be required.

A promotion HTML task manages previously prepared and authenticated promotional HTML pages received from the service center. Promotional HTML pages are displayed to fueling consumers, for example, during the fueling time. The promotional HTML task authenticates promotional pages according to a prescribed authentication code derived using, for example, an DES encryption algorithm operating in block mode. A prescribed customer software/HTML authentication function certifies an acceptability of the individual pages.

Once a fueling transaction has been initiated, the SFC allows the external marketing system service (EMSS) temporary access to the DSM 60 to deliver promotional HTML pages at the time and order specified by the EMSS task. In this condition, the EMSS task assumes the temporary role of a POS in that it selects HTML pages to be delivered to a particular fueling point based on events occurring at that fueling point. Events created by the consumer responding to solicitations of the pages are made available to the EMSS task. The EMSS task does not send HTML pages to the SFC for immediate display, but may only request delivery of particular pages maintained by the SFC. Control of a given dispenser returns to the POS at the conclusion of a fueling transaction.

Diagnostic/download/configuration tasks are applications serviced by TCP/IP. For example, a system manager module (SSM) 66 will open a diagnostic task if it has received a watchdog timeout from the DM. The SSM 66 can download application or diagnostic files to DMs using FTP. The SSM 66 can also configure the SFC or the DM to unique site requirements.

As discussed, the fuel dispenser emulator and CAT emulator present an interface to the legacy POS indistinguishable from the interface presented by a standard dispenser interface. The emulators translate POS commands as well as returning dispenser responses.

The POS driver of SFC 16 as discussed herein, including an asynchronous serial communications driver, communicates data to/from up to two possible LPOS terminals. The optional local service terminal (LST) 24 connects to the SFC 16 through a serial port with modem. The LST can be equipped with a keyboard, display, and an optional printer and supports FTP/HTTP protocols. The LST facilitates the ability of a station attendant or other personnel to review the dispenser status/information/configuration data, initiate diagnostic tests, and download new application program files.

The SFC 16 also includes an Ethernet POS driver. This optional connection allows Ethernet-ready POS terminals to send and receive data to and from the SFC. If the POS protocol is a legacy type, such as a Nucleus POS from Wayne Division, Dresser Equipment Group, Inc. of Austin, Tex., then the LPOS connects via the dispenser emulator and CAT emulator tasks. A new generation POS designed for new generation dispenser protocol would bypass the dispenser and CAT emulators and communicate directly with the dispenser server task. For example, if an Ethernet-ready POS executes a dispenser emulator function internally, then the POS can connect directly to a status/control block and data transfer buffer, bypassing the dispenser and CAT emulators of the SFC 16.

The dispenser manager/site forecourt controller interface is further characterized as follows. A system monitor process switches between browser applications, local display or to stand-lone modes. The system monitor processes can also open/close file download/upload, configuration and diagnostic tasks. The system monitor process also will communicate with the I/O manager to get the necessary data from the SFC. The system monitor furthermore monitors the system memory usage and applications performance (using a software watchdog timer to monitor system activity).

An I/O Manager handles all I/O events either from the SFC or those that are locally generated. All data transfer is via a same socket application. Consequently, the I/O manager does not need to distinguish between an on-line and an off-line operation mode. A standalone application will be similar to the network application (i.e., one application can be implemented for use in both places).

When a dispenser is in an off-line mode, a browser of the DM renders HTML pages "pushed" by the SFC server. Pages and bitmap images may be cached within a DM memory. The DM browser processes any cached images in the off-line standalone and in the off-line maintenance modes. The browser may also size HTML pages authored in "full" size, using a prescribed soft-key template and a standard HTML authoring tool as well as have capability to render full-motion video streams.

As discussed, a DM display can include monochrome or color LCD panels having a viewing window. The DM drives two display panels, one display panel for each side of a dispenser. In addition, the SFC and DM platform resources can be expanded, as desired, to support two full-motion color displays driven from MPEG-2 or equivalent compression video streams over the 100 mb/s forecourt communication data link.

In one embodiment, HTML pages are authored using standard commercially available HTML page tools. The template of the HTML page can include, for example, eight legend areas positioned on the left and right sides of the page. The legend areas are reserved for key legends and also contain a non-displayed URL linked to an adjacent soft key. In addition, a general display area may include those legend areas not being used for key legends. For a particular page having inactive soft keys, the full area of the display panel may be used.

With respect to dispenser system operating modes, the dispensers in the system operate in either a self-service or a full-service mode, as controlled by a configuration file resident in the POS. In the self-service mode, a customer performs all the necessary operations for delivery and payment for fuel. In the full-service mode, an attendant performs all operations necessary to deliver fuel and collect payment from the customer. The full-service mode is also the mode the dispenser enters when off-line and not communicating with the SFC or POS.

In the self-service mode, the POS directs the consumer's actions by issuing prompts to the DM display. For each text prompt, the SFC substitutes an HTML page for display at the DM. The selected HTML page may display different text and/or graphics that differ from the prompt string to prompt the consumer to take a desired action or to solicit a desired response. With respect to legacy POS systems, the legacy memory references or text strings cause an appropriate HTML page to be displayed.

The full service mode provides for operation of the dispenser by an attendant or customer services representative CSR. An initial page HTML prompt is "CASH YES/NO?", or equivalent message. The CSR selects the method of payment by pressing either the YES or NO soft key. If the CSR presses "YES", the method of payment could include credit, debit or a stored value and would be handled in a manner similar as cash for prompting and cashout purposes. The POS responds by releasing the dispenser. Dispensing, however, would not commence, however, until the CSR has completed an HTML Order form. With an HTML order form, the CSR selects purchase price or purchase volume for a preset sale.

Upon completing the HTML order form, the CSR then pushes the "start" key that presets and releases the dispenser for fueling. At the conclusion of the sale, the purchase amount appears in the dispenser sale window. A sale-concluded HTML page may display then any refund due to the customer. An appropriate "Used" status would be set and the sale transaction data posted for the POS. The CSR completes the details of the sale transaction, with the DM operating independently of the POS, until the sale terminates. The POS then collects the details of the sale.

Further with respect to diagnostics/download/configuration tasks, a file download task downloads new application software, drivers, and system files to the DM, downloading files until a given transfer is complete. Following download complete, a validation task is initiated. The validation task validates the firmware authentication code (FAC). If the firmware does not validate, the DM reports the failure to the SFC. At this point, the DM is executing without memory backup, awaiting another download attempt. The SFC controls the number of download attempts to a DM and terminates the task. In the event of a prescribed number of failed download attempts, the SFC reloads the previous firmware version. If reloading of the previous firmware fails, the dispenser is taken off-line and a "call home" task is executed by the SFC.

The configuration task transfers dispenser templates, data structures and default settings to the dispenser. For configuration templates directed to the GEM, the DM will place the GEM in a "maintenance mode" and download the configuration template into the GEM. Following satisfactory download, an acknowledgement is sent from the DM to the SFC. If no acknowledgement or a negative acknowledgement is sent then the attempt will be repeated by the SFC until a predetermined number of unsuccessful attempts have been made, at which time the dispenser will be placed off-line and a "call home" message will be initiated to the RSC port.

As noted, communication between the DM and the GEM is via the communication link 78. As status conditions change at the GEM, the status conditions are immediately communicated to the DM, which immediately forwards them to the SFC.

Control commands, responsive to POS datalink commands, are converted in the SFC, sent to the DM, which forwards them to the GEM for execution. Exemplary control commands may include: Authorize (authorizes a dispenser to dispense from a specified, or any product, position), Set Stop (closes valves and stops pumps), Clear Stop (restores valves and pump to prior status), Set Cash Mode (cash price for the selected position is used for the transaction), Set Credit Mode (credit price for the selected position is used for the transaction), etc.

With respect to reported status, the GEM reports operational status for each fueling point to the DM. The DM collects status information and forwards it to the SFC. The SFC maintains the status elements for developing and delivering reports to the POS in response to POS data link commands. Options and normal operational data elements reported to the SFC include, but are not limited to, authorized (by product position(s)), credit price mode, dual unit price displays, sale volume decimal point position, sale currency decimal point position, in-use, local authorized, paused (valves only closed), stopped (valves closed and pump off), gallon (liter) volume unit, lock unit price (cash/credit) at fast flow, active nozzle positions (products), electronic totalizer display format, decimal position of money totalizers, nozzle totalizer cash amount, nozzle totalizer credit amount, nozzle totalizer (cash and credit) amount, nozzle totalizer volume amount, unit price (nozzle A), unit price (nozzle B), sale delivery limit, sale volume progress, etc.

In one embodiment of the present disclosure, communication between the SFC and dispenser employs the TCP/IP protocol at the session level. Application level communication employs HTTP encapsulated in TCP/IP for communication between the server resident in the SFC and the DM-resident browsers. In addition, suitable full motion video communication and audio communication protocols are used for video and audio communications.

The various software tasks discussed herein may be programmed using programming techniques known in the art for carrying out the respective functions. Accordingly, the site architecture of the present embodiments utilize a computer, preferably a personal computer (PC) or the like, to act as an agent for translating traditional pump interface protocols of a LPOS system to high speed interfaces of new generation fuel dispensers. The protocols of the newer generation fuel dispensers include transport control protocol/Internet protocol (TCP/IP) and hypertext transport protocol (HTTP). An exemplary high-speed interface includes Ethernet. In addition, the present embodiments include computer program software stored on a compute-readable medium, such as, a memory device, diskette, hard drive, CD-ROM, database 62 or other known computer-readable medium.

Utilization of the present embodiments advantageously allows both existing and newly constructed gasoline stations to install new generation fuel dispensers having the high-speed interfaces. By providing a mechanism for backward compatibility, the introduction of new generation fuel dispensers is greatly facilitated. The method and apparatus of the present embodiments does not require the changing of a pre-existing LPOS site controller at the same time as the fuel dispenser or dispensers. The new fuel dispensers can be installed as appropriate, whether as an upgrade to an established fueling retail station or a newly constructed station.

Another advantage of installing the new generation fuel dispensers at the earliest possible time is that the new features and functions provided by the new generation fuel dispensers can immediately be incorporated into the operation of a pre-existing gasoline station. Exemplary new features include, but are not limited to, displaying world wide web based content, customized graphic content, video based advertising, reporting and analysis of enhanced diagnostics, and the ability to remotely upgrade dispenser software. These new features of the new generation dispensers are not presently supported by existing older generation site controllers.

The site forecourt controller (SFC) of the present embodiments accordingly acts as a bridge providing a means to employ new dispenser features at an existing fuel station without adverse impact to the existing site controller functionality. The SFC interface of the present disclosure operates by intercepting traditional commands, such as Read Pump Sale Value or Display Payment Options for Selection (such as Credit, Debit, Fleet, etc.), intended for traditional dispensers from an existing LPOS site controller. Upon intercepting the traditional commands, the SFC interface replaces such traditional commands with prescribed equivalent commands for the new generation dispensers. The SFC also provides for conversion of any electrical differences between the existing site controller interfaces and the new, high speed, fuel dispenser interfaces. Older protocols can include, for example, Wayne Pump Protocol and Wayne CAT protocol developed by Wayne Division, Dresser Equipment Group, Inc. of Austin, Tex.

As mentioned earlier, the old dispenser interfaces include, for example, asynchronous serial communication interfaces. In contrast, the protocols for the new generation dispensers include TCP/IP and HTTP. In addition, the electrical interfaces of the new generation dispensers are Ethernet. Ethernet is a type of network cabling and signaling specification, such as described in the IEEE 802.3 standard or other similar standards.

Accordingly, an SFC interface has been provided for connection between standard LPOS system and at least one new generation fuel dispenser or dispensers. The SFC interface allows traditional signals from the LPOS system to pass and, in addition, allows for new features and functionality of the new generation dispensers to be connected to an older generation fuel dispensing site architecture system without changing the LPOS computer.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A retail petroleum station site architecture comprising:
at least one point-of-sale (POS) controller, said POS controller providing at least one function selected from the group consisting of cash register, dispenser control, transaction card processing, and scanning;
at least one new generation fuel dispenser including a customer access terminal(CAT) and a dispenser control unit, said new generation fuel dispenser having at least one feature which is unsupported by said POS controller, the unsupported feature including at least one of either a customer access terminal control function or a dispenser control function of a said new generation fuel dispenser; and
a site forecourt controller coupled between said POS controller and said new generation fuel dispenser, said site forecourt controller including means for interfacing said POS controller with said new generation fuel dispenser, said interfacing means providing a protocol and electrical signal interface between a first protocol and electrical signal requirement of said POS controller and a second protocol and electrical signal requirement of said new generation fuel dispenser.

2. The retail petroleum station site architecture of claim 1, wherein the first protocol and electrical signal requirement includes an asynchronous serial communication link and the second protocol and electrical signal requirement includes at least one of FTP, HTTP, TCP/IP, and Ethernet.

3. The retail petroleum station site architecture of claim 1, wherein the interfacing means of said site forecourt controller includes a customer access terminal emulator.

4. The retail petroleum station site architecture of claim 3, wherein the customer access terminal emulator is responsive to said POS controller for translating a first set of legacy POS customer access terminal commands received from said POS controller into a second set of POS customer access terminal commands suitable for use by the customer access terminal of said new generation fuel dispenser, the second set of POS customer access terminal commands including suitable commands for handling the customer access terminal control function of the at least one feature which is unsupported by said POS controller.

5. The retail petroleum station site architecture of claim 4, wherein the customer access terminal emulator is further responsive to the customer access terminal of said new generation fuel dispenser for translating a second set of POS customer access terminal messages received from the customer access terminal of said new generation fuel dispenser into a first set of legacy POS customer access terminal messages suitable for use by said POS controller.

6. The retail petroleum station site architecture of claim 1, wherein the interfacing means of said forecourt site controller includes a dispenser emulator.

7. The retail petroleum station site architecture of claim 6, wherein the dispenser emulator is responsive to said POS controller for translating a first set of legacy POS dispenser control commands received from said POS controller into a second set of POS dispenser control commands suitable for use by the dispenser control unit of said new generation fuel dispenser, the second set of POS dispenser control commands including suitable commands for handling the dispenser control function of the at least one feature which is unsupported by said POS controller.

8. The retail petroleum station site architecture of claim 7, wherein the dispenser emulator is further responsive to the dispenser control unit of said new generation fuel dispenser for translating a second set of POS dispenser control messages received from the dispenser control unit of said new generation fuel dispenser into a first set of legacy POS dispenser control messages suitable for use by said POS controller.

9. A retail petroleum station site architecture comprising:
at least one point-of-sale (POS) controller, said POS controller providing at least one function selected from the group consisting of cash register, dispenser control, transaction card processing, and scanning;
at least one new generation fuel dispenser including a customer access terminal(CAT)and a dispenser control unit, said new generation fuel dispenser having at least one feature which is unsupported by said POS controller, the unsupported feature including at least one of either a customer access terminal control function or a dispenser control function of said new generation fuel dispenser; and
a site forecourt controller coupled between said POS controller and said new generation fuel dispenser, said site forecourt controller including means for interfacing said POS controller with said new generation fuel dispenser, said interfacing means providing a protocol and electrical signal interface between a first protocol and electrical signal requirement of said POS controller and a second protocol and electrical signal requirement of said new generation fuel dispenser,
wherein the interfacing means of said site forecourt controller includes a customer access terminal emulator, the customer access terminal emulator being responsive to said POS controller for translating a first set of legacy POS customer access terminal commands received from said POS controller into a second set of POS customer access terminal commands suitable for use by the customer access terminal of said new generation fuel dispenser, the second set of POS customer access terminal commands including suitable commands for handling the customer access terminal control function of the at least one feature which is unsupported by said POS controller, wherein the customer access terminal emulator further being responsive to the customer access terminal of said new generation fuel dispenser for translating a second set of POS customer access terminal messages received from the customer access terminal of said new generation fuel dispenser into a first set of legacy POS customer access terminal messages suitable for use by said POS controller,
wherein the interfacing means of said forecourt site controller further includes a dispenser emulator, the dispenser emulator being responsive to said POS controller for translating a first set of legacy POS dispenser control commands received from said POS controller into a second set of POS dispenser control commands suitable for use by the dispenser control unit of said new generation fuel dispenser, the second set of POS dispenser control commands including suitable commands for handling the dispenser control function of the at least one feature which is unsupported by said POS controller, wherein the dispenser emulator further being responsive to the dispenser control unit of said new generation fuel dispenser for translating a second set of POS dispenser control messages received from the dispenser control unit of said new generation fuel dispenser into a first set of legacy POS dispenser control messages suitable for use by said POS controller.

10. The retail petroleum station site architecture of claim 9, wherein the first protocol and electrical signal requirement includes an asynchronous serial communication link and the second protocol and electrical signal requirement includes at least one of FTP, HTTP, TCPAP, and Ethernet.

11. A method for upgrading a retail petroleum station site architecture comprising:
providing at least one point-of-sale (POS) controller, the POS controller capable of at least one function selected from the group consisting of cash register, dispenser control, transaction card processing, and scanning;
providing at least one new generation fuel dispenser including a customer access terminal (CAT) and a dispenser control unit, the new generation fuel dispenser having at least one feature which is unsupported by the POS controller, the unsupported feature including at least one of either a customer access terminal control function or a dispenser control function of the new generation fuel dispenser; and
providing a site forecourt controller coupled between the POS controller and the new generation fuel dispenser, the site forecourt controller including means for interfacing the POS controller with the new generation fuel dispenser, the interfacing means providing a protocol and electrical signal interface between a first protocol and electrical signal requirement of the POS controller and a second protocol and electrical signal requirement of the new generation fuel dispenser.

12. The method of claim 11, wherein the first protocol and electrical signal requirement includes an asynchronous serial communication link and the second protocol and electrical signal requirement includes at least one of FTP, HTTP, TCP/IP, and Ethernet.

13. The method of claim 11, wherein the interfacing means of the site forecourt controller includes a customer access terminal emulator.

14. The method of claim 13, wherein the customer access terminal emulator is responsive to the POS controller for translating a first set of legacy POS customer access terminal commands received from the POS controller into a second set of POS customer access terminal commands suitable for use by the customer access terminal of the new generation fuel dispenser, the second set of POS customer access terminal commands including suitable commands for handling the customer access terminal control function of the at least one feature which is unsupported by the POS controller.

15. The method of claim 14, wherein the customer access terminal emulator is further responsive to the customer access terminal of the new generation fuel dispenser for translating a second set of POS customer access terminal messages received from the customer access terminal of the new generation fuel dispenser into a first set of legacy POS customer access terminal messages suitable for use by the POS controller.

16. The method of claim 11, wherein the interfacing means of the forecourt site controller includes a dispenser emulator.

17. The method of claim 16, wherein the dispenser emulator is responsive to the POS controller for translating a first set of legacy POS dispenser control commands received from the POS controller into a second set of POS dispenser control commands suitable for use by the dispenser control unit of the new generation fuel dispenser, the second set of POS dispenser control commands including suitable commands for handling the dispenser control function of the at least one feature which is unsupported by the POS controller.

18. The method of claim 17, wherein the dispenser emulator is further responsive to the dispenser control unit of the new generation fuel dispenser for translating a second set of POS dispenser control messages received from the dispenser control unit of the new generation fuel dispenser into a first set of legacy POS dispenser control messages suitable for use by the POS controller.

19. A method for upgrading a retail petroleum station site architecture comprising: providing at least one point-of-sale (POS) controller, the POS controller providing at least one function selected from the group consisting of cash register, dispenser control, transaction card processing, and scanning;
providing at least one new generation fuel dispenser including a customer access terminal (CAT) and a dispenser control unit, the new generation fuel dispenser having at least one feature which is unsupported by the POS controller, the unsupported feature including at least one of either a customer access terminal control function or a dispenser control function of the new generation fuel dispenser; and providing a site forecourt controller coupled between the POS controller and the new generation fuel dispenser, the site forecourt controller including means for interfacing the POS controller with the new generation fuel dispenser, the interfacing means providing a protocol and electrical signal interface between a first protocol and electrical signal requirement of the POS controller and a second protocol and electrical signal requirement of the new generation fuel dispenser,
wherein the interfacing means of the site forecourt controller includes a customer access terminal emulator, the customer access terminal emulator being responsive to the POS controller for translating a first set of legacy POS customer access terminal commands received from the POS controller into a second set of POS customer access terminal commands suitable for use by the customer access terminal of the new generation fuel dispenser, the second set of POS customer access terminal commands including suitable commands for handling the customer access terminal control function of the at least one feature which is unsupported by the POS controller, wherein the customer access terminal emulator further being responsive to the customer access terminal of the new generation fuel dispenser for translating a second set of POS customer access terminal messages received from the customer access terminal of the new generation fuel dispenser into a first set of legacy POS customer access terminal messages suitable for use by the POS controller,
wherein the interfacing means of the forecourt site controller further includes a dispenser emulator, the dispenser emulator being responsive to the POS controller for translating a first set of legacy POS dispenser control commands received from the POS controller into a second set of POS dispenser control commands suitable for use by the dispenser control unit of the new generation fuel dispenser, the second set of POS dispenser control commands including suitable commands for handling the dispenser control function of the at least one feature which is unsupported by the POS controller, wherein the dispenser emulator further being responsive to the dispenser control unit of the new generation fuel dispenser for translating a second set of POS dispenser control messages received from the dispenser control unit of the new generation fuel dispenser into a first set of legacy POS dispenser control messages suitable for use by the POS controller.

20. The method of claim 19, wherein the first protocol and electrical signal requirement includes an asynchronous serial communication link and the second protocol and electrical signal requirement includes at least one of FTP, HTTP, TCP/IP, and Ethernet.

21. A computer program for upgrading a retail petroleum station site architecture, the architecture including a point-of-sale (POS) controller, a new generation fuel dispenser, and a site forecourt controller coupled between the POS controller and the new generation fuel dispenser, the computer program stored on a computer-readable medium and comprising:
instructions for implementing within the site forecourt controller an interface between the POS controller with the new generation fuel dispenser, the interface providing a protocol and electrical signal interface between a first protocol and electrical signal requirement of the POS controller and a second protocol and electrical signal requirement of the new generation fuel dispenser;
instructions for implementing a customer access terminal emulator, the customer access terminal emulator being responsive to the POS controller for translating a first set of legacy POS customer access terminal commands received from the POS controller into a second set of POS customer access terminal commands suitable for use by a customer access terminal of the new generation fuel dispenser, the second set of POS customer access terminal commands including suitable commands for handling a customer access terminal control function of at least one feature which is unsupported by the POS controller, wherein the customer access terminal emulator further being responsive to the customer access terminal of the new generation fuel dispenser for translating a second set of POS customer access terminal messages received from the customer access terminal of the new generation fuel dispenser into the first set of legacy POS customer access terminal messages suitable for use by the POS controller; and
instructions for implementing a dispenser emulator, the dispenser emulator being responsive to the POS controller for translating a first set of legacy POS dispenser control commands received from the POS controller into a second set of POS dispenser control commands suitable for use by a dispenser control unit of the new generation fuel dispenser, the second set of POS dispenser control commands including suitable commands for handling a dispenser control function of at least one feature which is unsupported by the POS controller, wherein the dispenser emulator further being responsive to the dispenser control unit of the new generation fuel dispenser for translating a second set of POS dispenser control messages received from the dispenser control unit of the new generation fuel dispenser into a first set of legacy POS dispenser control commands suitable for use by the POS controller.

22. The computer program of claim 21, wherein the first protocol and electrical signal requirement includes an asynchronous serial communication link and the second protocol and electrical signal requirement includes at least one of FTP, HTTP, TCP/IP and Ethernet.

23. A site forecourt controller for use in upgrading a retail petroleum station site architecture, the architecture including a point-of-sale (POS) controller and a new generation fuel dispenser, said site forecourt controller comprising:
means for interfacing the POS controller with the new generation fuel dispense, said interface means providing a protocol and electrical signal interface between a first protocol and electrical signal requirement of the POS controller and a second protocol and electrical signal requirement of the new generation fuel dispenser;

means for implementing a customer access terminal emulator, the customer access terminal emulator being responsive to the POS controller for translating a first set of legacy POS customer access terminal commands received from the POS controller into a second set of POS customer access terminal commands suitable for use by a customer access terminal of the new generation fuel dispenser, the second set of POS customer access terminal commands including suitable commands for handling a customer access terminal control function of at least one feature which is unsupported by the POS controller, wherein the customer access terminal emulator further being responsive to the customer access terminal of the new generation fuel dispenser for translating a second set of POS customer access terminal messages received from the customer access terminal of the new generation fuel dispenser into a first set of legacy POS customer access terminal messages suitable for use by the POS controller; and means for implementing a dispenser emulator, the dispenser emulator being responsive to the POS controller for translating a first set of legacy POS dispenser control commands received from the POS controller into a second set of POS dispenser control commands suitable for use by a dispenser control unit of the new generation fuel dispenser, the second set of POS dispenser control commands including suitable commands for handling a dispenser control function of at least one feature which is unsupported by the POS controller, wherein the dispenser emulator further being responsive to the dispenser control unit of the new generation fuel dispenser for translating a second set of POS dispenser control messages received from the dispenser control unit of the new generation fuel dispenser into a first set of legacy POS dispenser control messages suitable for use by the POS controller.

24. The forecourt site controller of claim 23, wherein the first protocol and electrical signal requirement includes an asynchronous serial communication link and the second protocol and electrical signal requirement includes at least one of FTP, HTTP, TCP/IP, and Ethernet.

25. A fuel station site architecture comprising:

at least one point-of-sale (POS) controller;

at least one new generation fuel dispenser having advanced features; and a site forecourt controller coupled between said POS controller and said fuel dispenser, said site forecourt controller for interfacing said POS controller with said fuel dispenser by providing a protocol and electrical signal interface between a first protocol and electrical signal requirement of said POS controller and a second protocol and electrical signal requirement of said fuel dispenser, wherein the second protocol and electrical signal requirement include requirements for features which may not be supported by a prescribed POS controller.

26. The fuel station site architecture of claim 25, wherein said POS controller is a legacy POS controller.

27. The fuel station site architecture of claim 25, wherein said POS controller is anew generation POS controller.

28. The fuel station site architecture of claim 25, wherein said fuel dispenser includes a display means for displaying video images, said fuel station architecture further comprising: a video server coupled to said new generation fuel dispenser, said video server for providing a prescribed video signal to be displayed by the display means of said new generation fuel dispenser.

29. The fuel station site architecture of claim 28, wherein said POS controller is a legacy POS controller.

30. The fuel station site architecture of claim 28, wherein said POS controller is a new generation POS controller.

* * * * *